US005635551A

United States Patent [19]
Lee

[11] Patent Number: 5,635,551
[45] Date of Patent: Jun. 3, 1997

[54] COMPOSITIONS FOR USE IN MOLDING PRODUCTS FROM UNUSABLE TIRES

[76] Inventor: Whanjo Lee, 746-18, Weonkok-Dong, Ansan-Si, Kyunggi-Do, Rep. of Korea

[21] Appl. No.: 634,888

[22] Filed: Apr. 19, 1996

Related U.S. Application Data

[63] Continuation-in-part of Ser. No. 301,336, Sep. 6, 1994, abandoned.

Foreign Application Priority Data

Mar. 19, 1994 [KR] Rep. of Korea ............... 1994-5563

[51] Int. Cl.$^6$ ............... C08L 17/00; C08K 3/40; C08K 5/521
[52] U.S. Cl. ............... 524/52; 524/364; 524/365; 524/416; 524/525; 525/232
[58] Field of Search ............... 524/52, 364, 365, 524/416, 525; 525/232

[56] References Cited

U.S. PATENT DOCUMENTS

| | | | |
|---|---|---|---|
| 5,010,122 | 4/1991 | Koski | 524/80 |
| 5,157,082 | 10/1992 | Johnson | 525/232 |
| 5,312,573 | 5/1994 | Rosenbaum | 264/37 |

*Primary Examiner*—David Buttner
*Attorney, Agent, or Firm*—Ladas & Parry

[57] ABSTRACT

A composition for molding products from unusable tires is disclosed. The composition for molding consists of pulverized tires, one or more resins selected from polypropylene resin, low density polyethylene resin and high density polyethylene resin and one or more chemicals selected from the group of acetone, caustic soda, glass wool, ammonium phosphate, starch and pigments. The composition components are well mixed, melted at 230° C. to 350° C. and molded by injecting, extruding or pressing. Products formed from the composition can be used to form various kinds of industrial construction materials which have high strength and smooth surface.

1 Claim, No Drawings

COMPOSITIONS FOR USE IN MOLDING PRODUCTS FROM UNUSABLE TIRES

This application is a continuation-in-part of application Ser. No. 08/301,336 filed on Sep. 6, 1994, now abandoned.

FIELD OF THE INVENTION

The present invention relates to compositions including unusable tires and, more particularly, to compositions for manufacturing various mold products with different properties from a mixture of pulverized tire, resins and chemicals. This compounded raw-material can be turned into a desired product after an injecting, extruding, and pressing process.

BACKGROUND OF THE INVENTION

The car industry is globally recognized as the most productive and fastest growing industry in this modern society. The cars, the most useful and essential aid to mankind, can offer convenient transportation, and are closely related to people's everyday lives. Especially in the society, which requires frequent traveling, people can not even think about maintaining their everyday lives without the cars. But as the car production grows rapidly, the environmental pollution caused by the cars has raised serious problems to us.

Along with the environmental pollution caused by the cars, such as air pollution from the toxic gas or abandoned cars on streets, disposing of the used tires is also one of the serious environmental pollutions. There have been many efforts to recycle the tires preventing environmental pollution and utilizing the valuable energy resource. But unfortunately, the tires have been made into only a few types of products, and the portion of the recycled tires is small compared to the mass-produced tires. The tires are cut into narrow pieces and made into ropes or rubber baskets. Except for the recycling process above, most of the tires are burned up to ashes in incinerators. But burning the tires not only causes air pollution from toxic gas, but wastes valuable resources which we can recycle into a raw-material to make various products instead. Furthermore, burning tires is now prohibited by law and, as a result, we are facing the new problem of recycling the enormous amount of mass-produced tires. If we can transfer the tires into valuable resources, it can prevent environmental pollution and save energy. With the present invention, this can be possible with the mixture of the pulverized tires, resins and chemicals. The present invention is surely a breakthrough to reduce the pollution, conserve the precious energy, and finally contribute to the development of the nation's industry.

Trying to find the solution of the problems above, the inventor invested large amount of finance in the research of the recycling technique of tires, and finally has come to develop a reformable raw-material which can be applied in many different areas of our industries.

SUMMARY OF THE INVENTION

It is an object of the present invention to recycle used tires into useful resources.

It is another object of the present invention to prevent environmental pollution from burning tires and the loss of energy.

It is a further object of the present invention to provide compositions for various kinds of mold products which can satisfy many different requirements such as a smooth surface, a strong structure, an elegant appearance and so on.

In accordance with the above and other objects of the invention, there is provided an improved composition for use in molding an article. The composition contains pulverized recycled tire and at least one resin. The pulverized tire is present in the composition in an amount of about 15 to 90 weight percent. The at least one resin is selected from the group consisting of polypropylene, high density polyethylene and low density polyethylene and is present in the composition in an mount of about 10 to 50 weight percent. To achieve desirable properties in the article molded from the composition, the composition also includes one or more of acetone, caustic soda, glass wool, ammonium phosphate and starch. In a preferred embodiment of the invention the composition includes acetone, caustic soda, glass wool, ammonium phosphate and starch respectively in amounts of 0.03%–5%, 0.05%–0.5%, 5%–30%, 0.5%–5% and 3%–15% by weight.

A method of manufacturing mold products with unusable tires according to the present invention includes the steps of mixing pulverized tire, one or more resins selected from the group of polypropylene, low density polyethylene and high density polyethylene and one or more chemicals selected from the group of acetone, caustic soda, glass wool, ammonium phosphate, starch and pigments; melting the mixture at 230° C. to 350° C.; and molding by a catapulting, extruding and pressing process.

DESCRIPTION OF THE PREFERRED EMBODIMENT

In the present invention, the size of the pulverized tire particles is not specifically stated. Therefore, the tires can be crushed into suitable sized particles according to the purpose of the targeted products. The proportion of the pulverized tires in the mixture is not specified, but it is desirable to use 15 to 90 weight percent of the mixture. To crush the tires into fine particles, a frozen crush technique with liquid nitrogen can be effectively used.

Used or scrapped resins of each kind can replace the above resins such as polypropylene resin, low density polyethylene resin and high density polyethylene resin and the contents of the above resins are respectively desirably under 50 weight percent of the composition. Nylon, polyester or other synthetic resins can be added or applied to replace the above resins.

One or more chemicals among acetone, caustic soda, glass wool, ammonium phosphate, starch and pigments are used according to the purpose of the targeted products. For example, to make smooth surface and strong products such as construction board, street bricks and boxes, acetone, caustic soda, glass wool, ammonium phosphate, starch, and pigments are employed. To make water-purifier-tanks, irrigation pipes and sewer pipes, acetone, glass wool, ammonium phosphate and starch are employed. For applications of flexible panels, buckets and washbasins, caustic soda, glass wool, ammonium phosphate and starch are applied. In case of the products with elasticity and high strength such as median strip in highways, acetone, caustic soda, glass wool, starch, and some pigments are mixed with the pulverized tire. For the breakwater in seashores, acetone is used. For a product requiring high hardness and tensile strength such as an embankment to prevent landsliding and palettes, glass wool, ammonium phosphate, starch and pigments are used. For interior finish work such as bricks and set building frame which requires good hardness, glass wool, acetone, ammonium phosphate and pigments are needed.

It is difficult to limit the exact weight proportion of each chemical in the mixture, but it is desirable to use approximately under 0.5 weight % of the acetone, 0.5 weight % of the caustic soda, 30 weight % of the glass wool, 5 weight % or less of the ammonium phosphate, and 15 weight % of the starch.

Acetone is used as the solvent, and if more than 5 weight % of the weight content is supplied, this can lower the quality of the product caused by oversupplying of the solvent. Caustic soda makes many fine bubbles in the mixture to increase the shock absorbing capability and elasticity of the product. Oversupplying of the caustic soda (more than 0.5%) can cause too many bubbles in the product and lower the quality of the product too. Glass wool increases the thermal resistance of the product, but oversupplying causes inferior quality of the product, and it results in difficult, molding process of the product. Ammonium phosphate increases the fire-resistance of the product.

The present invention is illustrated by way of the following Examples, in which all percent (%) are by weight unless otherwise specified.

EXAMPLE 1

| | |
|---|---|
| Pulverized used tire | 50% |
| Polypropylene resin | 14.25% |
| Low density polyethylene resin | 14.25% |
| High density polyethylene resin | 11.11% |
| Acetone | 0.03% |
| Caustic soda | 0.06% |
| Glass wool | 5.63% |
| Ammonium phosphate | 1.5% |
| Starch | 3.05% |
| Pigment | 0.12% |

This compound substance was mixed and heated at 320° C. for 3 minutes and processed through catapulting, extruding, and pressing procedures after melting.

Materials suitable for various panels, street bricks, and boxes which have superior quality of high strength and smooth surface could be produced.

EXAMPLE 2

| | |
|---|---|
| Pulverized used tire | 60% |
| Polypropylene resin | 10% |
| Low density polyethylene resin | 10% |
| High density polyethylene resin | 10% |
| Acetone | 0.05% |
| Caustic soda | 0.06% |
| Glass wool | 5% |
| Ammonium phosphate | 0.81% |
| Starch | 3% |
| Pigment | 1.08% |

This compound substance was mixed and heated at 320° C. for 3 minutes and processed through catapulting, extruding, and pressing procedures after melting.

Materials suitable for the cement bricks, panels or boxes which are strong and soft-surface material could be produced.

EXAMPLE 3

| | |
|---|---|
| Pulverized used tire | 65% |
| Polypropylene resin | 5% |
| Low density polyethylene resin | 5% |

-continued

| | |
|---|---|
| High density polyethylene resin | 13% |
| Acetone | 0.03% |
| Glass wool | 7.2% |
| Ammonium phosphate | 0.77% |
| Starch | 4% |

This compound substance was mixed and heated at 320° C. for 3 minutes and processed through catapulting, extruding, and pressing procedures after melting.

Materials suitable for the water-purifier-tanks, irrigation pipes and boxes which have superior quality of solidity and smooth surface could be produced.

EXAMPLE 4

| | |
|---|---|
| Pulverized used tire | 70% |
| Polypropylene resin | 10% |
| Low density polyethylene resin | 8% |
| Caustic soda | 0.2% |
| Glass wool | 7% |
| Ammonium phosphate | 0.8% |
| Starch | 4% |

This compound substance was mixed and heated at 320° C. for 3 minutes and processed through catapulting, extruding, and pressing procedures after melting.

Smooth and flexible materials such as panels, buckets and washbasins could be produced.

EXAMPLE 5

| | |
|---|---|
| Pulverized used tire | 78.5% |
| Polypropylene resin | 3% |
| Low density polyethylene resin | 3% |
| High density polyethylene resin | 6% |
| Acetone | 0.15% |
| Caustic soda | 0.3% |
| Glass wool | 5% |
| Pigment | 4% |
| Starch | 0.05% |

This compound substance was mixed and heated at 320° C. for 3 minutes and processed through catapulting, extruding, and pressing procedures after melting.

As a result, materials suitable for median strip in highways and so on which have soft and smooth surface and flexibility could be produced.

EXAMPLE 6

| | |
|---|---|
| Pulverized used tire | 75.95% |
| Polypropylene resin | 12% |
| Low density polyethylene resin | 12% |
| Acetone | 0.05% |

This compound substance was mixed and heated at 320° C. for 3 minutes and processed through catapulting, extruding, and pressing procedures after melting.

As a result, materials suitable for a breakwater in seashores which have soft and smooth surface and are resistant to seawater could be produced.

EXAMPLE 7

| | |
|---|---|
| Pulverized used tire | 40% |
| Polypropylene resin | 12% |
| Low density polyethylene resin | 12% |
| High density polyethylene resin | 15% |
| Glass wool | 15% |
| Ammonium phosphate | 0.9% |
| Starch | 5% |
| Pigment | 0.1% |

This compound substance was mixed and heated at 320° C. for 3 minutes and processed through catapulting, extruding, and pressing procedures after melting.

As a result, materials suitable for palettes or an embankment to prevent the landsliding which have good hardness and tensile strength could be produced. The materials can replace wood materials or synthetic resins.

EXAMPLE 8

| | |
|---|---|
| Pulverized used tire | 40% |
| Polypropylene resin | 10.5% |
| Low density polyethylene resin | 10.5% |
| High density polyethylene resin | 20% |
| Acetone | 0.03% |
| Glass wool | 14.9% |
| Ammonium phosphate | 0.9% |
| Starch | 3.07% |
| Pigment | 0.1% |

This compound substance was mixed and heated at 320° C. for 3 minutes and processed through catapulting, extruding, and pressing procedures after melting.

As a result, materials which have good solidity and tensile strength and can replace wood materials or synthetic resins could be produced.

EXAMPLE 9

| | |
|---|---|
| Pulverized used tire | 35% |
| Polypropylene resin | 30% |
| High density polyethylene resin | 15% |
| Glass wool | 12% |
| Ammonium phosphate | 2% |
| Starch | 6% |

This compound substance was mixed and heated at 320° C. for 3 minutes and processed through catapulting, extruding, and pressing procedures after melting.

As a result, materials which have good solidity and tensile strength and can replace wood materials or synthetic resins could be produced.

EXAMPLE 10

| | |
|---|---|
| Pulverized used tire | 24% |
| Polypropylene resin | 15% |
| Low density polyethylene resin | 15% |
| High density polyethylene resin | 15% |
| Glass wool | 25% |
| Acetone | 0.05% |
| Ammonium phosphate | 0.85% |
| Pigment | 0.1% |
| Starch | 5% |

This compound substance was mixed and heated at 320° C. for 3 minutes and processed through catapulting, extruding, and pressing procedures after melting.

As a result, materials suitable for interior finish works such as bricks and set building elements which have smooth and elegant surface and very high hardness could be produced.

EXAMPLE 11

| | |
|---|---|
| Pulverized used tire | 25% |
| Low density polyethylene resin | 45% |
| High density polyethylene resin | 15% |
| Glass wool | 14% |
| Acetone | 0.03% |
| Ammonium phosphate | 0.85% |
| Pigment | 0.12% |

This compound substance was mixed and heated at 320° C. for 3 minutes and processed through catapulting, extruding, and pressing procedures after melting.

As a result, materials suitable for interior finish works, set building elements, panels and so on which have smooth and elegant surface and good hardness could be produced.

EXAMPLE 12

| | |
|---|---|
| Pulverized used tire | 28% |
| Polypropylene resin | 15% |
| High density polyethylene resin | 42% |
| Glass wool | 14% |
| Acetone | 0.03% |
| Ammonium phosphate | 0.85% |
| Pigment | 0.12 |

This compound substance was mixed and heated at 320° C. for 3 minutes and processed through catapulting, extruding, and pressing procedures after melting.

As a result, materials suitable for interior finish works, set building elements, panels, bricks and so on which have smooth surface and good hardness could be produced. The materials can replace wood materials and cement products.

EXAMPLE 13

| | |
|---|---|
| Pulverized used tire | 25% |
| Polypropylene resin | 45% |
| High density polyethylene resin | 15% |
| Acetone | 0.03% |
| Glass wool | 14% |
| Ammonium phosphate | 0.85% |
| Pigment | 0.12% |

This compound substance was mixed and heated at 320° C. for 3 minutes and processed through catapulting, extruding, and pressing procedures after melting.

The smooth surfaced, elegant in appearance and hard materials suitable for the high class interior finish works or replacements of the synthetic resins or woods which require hard and smooth quality could be produced.

As described above molding products manufactured by the present invention are available for various kind of use such as panels, street bricks, guard lanes, palettes, median strip in highway, breakwater in seashore, irrigation water pipe, embankment to prevent the landslide, sewer/drain pipes, water-purifier tanks, high class interior finish work, flowerpot and washbasin.

In addition, according to the present invention, we can recycle the tires into valuable resources and prevent the loss of energy and environmental pollutions from the burning or abandoning of the tires. Further, producing beautiful and strong high quality products from the unusable tires can contribute to the development of the nation's industry and offer better quality of living to people.

The present invention is not limited to the embodiments described hereinabove. Various modifications of disclosed embodiments as well as other embodiments of the present invention will become apparent to persons skilled in the art upon reference to the description of the invention. It is therefore contemplated that the appended claims will cover such modifications and embodiments as fall within the true scope of the invention.

I claim:

1. An improved composition for use in molding an article, wherein the composition contains pulverized recycled tire and at least one resin, wherein the pulverized tire is present in the composition in an amount of about 15 to 90 weight percent, and wherein the at least one resin is selected from the group consisting of polypropylene, high density polyethylene and low density polyethylene and is present in the composition in an amount of about 10 to 50 weight percent, the improvement wherein the composition also includes acetone, caustic soda, glass wool, ammonium phosphate and starch respectively in an amount of 0.03%–5%, 0.05%–0.5%, 5%–30%, 0.5%–5% and 3%–15% by weight.

* * * * *